US007730677B2

(12) United States Patent
Hansen

(10) Patent No.: US 7,730,677 B2
(45) Date of Patent: Jun. 8, 2010

(54) BARRIER SYSTEM

(75) Inventor: Tracy C. Hansen, Hillsboro, OR (US)

(73) Assignee: Hansen Architectural Systems, Inc., Hillsboro, OR (US)

( * ) Notice: Subject to any disclaimer, the term of this patent is extended or adjusted under 35 U.S.C. 154(b) by 936 days.

(21) Appl. No.: 11/083,164

(22) Filed: Mar. 16, 2005

(65) Prior Publication Data

US 2005/0204659 A1 Sep. 22, 2005

Related U.S. Application Data

(60) Provisional application No. 60/553,673, filed on Mar. 16, 2004.

(51) Int. Cl.

| | |
|---|---|
| ***E06B 1/04*** | (2006.01) |
| ***E06B 3/32*** | (2006.01) |
| ***E06B 3/30*** | (2006.01) |
| ***E06B 3/988*** | (2006.01) |
| ***E06B 3/00*** | (2006.01) |
| ***A01G 17/06*** | (2006.01) |
| ***E04H 17/16*** | (2006.01) |
| ***E04H 17/14*** | (2006.01) |

(52) U.S. Cl. .................. 52/204.5; 52/204.1; 52/204.51; 52/204.593; 52/204.7; 256/23; 256/24; 256/59; 256/73

(58) Field of Classification Search ................... 256/21, 256/22, 24, 59, 63, 73; 52/100, 204, 204.1, 52/204.2, 204.3, 204.4, 204.5, 204.51, 204.593, 52/204.6, 204.7, 204.8, 204.9, 208, 280, 52/780, 781; 602/26

See application file for complete search history.

(56) References Cited

U.S. PATENT DOCUMENTS

| | | | |
|---|---|---|---|
| 2,135,389 | A | 11/1938 | Clarence |
| 2,763,048 | A | 9/1956 | Sullivan |
| 3,011,597 | A | 12/1961 | Galloway et al. |

(Continued)

FOREIGN PATENT DOCUMENTS

| | | |
|---|---|---|
| DE | 19802020 A1 * | 7/1999 |

(Continued)

OTHER PUBLICATIONS

C.R. Laurence Company, Architectural Railing Systems, HR09 Catalog, pp. R501 and R749. http://www.crlaurence.com/adv/cataloglibrary/hr09.html.*

(Continued)

*Primary Examiner*—Brian E Glessner
*Assistant Examiner*—Omar Hijaz
(74) *Attorney, Agent, or Firm*—Dorsey & Whitney LLP

(57) ABSTRACT

The present invention provides for a glass barrier system including at least one post adapted to support at least one piece of glass above a base structure, such as a concrete slab or a masonry wall. The post is connected with a support member extending from the base structure. In one embodiment, aluminum posts are supported by steel members embedded into and extending from concrete so as to suspend the aluminum posts above the concrete. Some embodiments of the present invention also utilize a glazing bead to help hold the glass in place with respect to the posts. The glass barrier system can also include a rail connected with the glass.

28 Claims, 6 Drawing Sheets

U.S. PATENT DOCUMENTS

| | | | | | |
|---|---|---|---|---|---|
| 3,506,243 | A | * | 4/1970 | Seiler | 256/59 |
| 4,603,520 | A | | 8/1986 | Deike | |
| 4,606,394 | A | * | 8/1986 | Bannister | 160/351 |
| 4,690,383 | A | * | 9/1987 | Batcheller | 256/24 |
| 5,076,032 | A | | 12/1991 | Lehman | |
| 5,765,333 | A | | 6/1998 | Cunningham | |
| 5,915,803 | A | * | 6/1999 | Daugherty et al. | 312/263 |
| 6,202,368 | B1 | * | 3/2001 | Wallace, III | 52/157 |
| 6,311,428 | B1 | * | 11/2001 | Marino et al. | 47/46 |
| 6,343,446 | B1 | | 2/2002 | Beard | |
| 6,866,251 | B2 | | 3/2005 | Rosaen | |

FOREIGN PATENT DOCUMENTS

WO WO 03091516 A1 * 11/2003

OTHER PUBLICATIONS

Brochure: "Sky Span: The Ultimate Tower View Railing System", Hansen Architectural Systems, 1 page, date unknown, available as early as Mar. 2004.

Brochure: "CRL C.R. Laurence Company: World's Largest Range of Glazing Products and Supplies", C.R. Laurence Co., Inc., 2 pages, date unknown, available as early as Mar. 2004.

Brochure: "New! Storefronts Online", C.R. Laurence Co., Inc., 2 pages, date unknown, available as early as Mar. 2004.

Brochure: "Architectural Hardware for the Glass Industry", C.R. Laurence Co., Inc., 6 pages, date unknown, available as early as Mar. 2004.

Brochure: "Innovative Aluminum Railing Systems", Hansen Architectural Systems, 4 pages, date unknown, available as early as Mar. 2004.

* cited by examiner

BARRIER SYSTEM

CROSS-REFERENCE TO RELATED APPLICATIONS

This application claims the benefit of U.S. Provisional Application No. 60/553,673, titled "Glass Barrier System," filed on Mar. 16, 2004, which is hereby incorporated herein by reference.

BACKGROUND OF THE INVENTION a. Field of the Invention

This invention relates to walls and fences, and more particularly, a glass barrier system that may be constructed in combination with a concrete slab or masonry wall.

b. Background Art

Glass wall and fence structures are known in the art and are commonly used as windbreaks, pool surrounds, and noise barriers. Glass walls can be used to create an effective barrier while at the same time, limiting the confining effect of fences made of non-translucent material. In many common designs, glass walls are constructed by supporting pieces of glass between aluminum posts grouted directly into and along the top of concrete slabs or walls. The glass pieces are supported by the aluminum posts by placing edges of the glass pieces in slots extending longitudinally along the length of the aluminum posts.

Many of the parts utilized in glass wall products currently available on the market were not specifically designed for use in glass wall applications. Instead, many of these products apply "off-the-shelf" parts and technology originally designed for use in constructing glass storefronts. For example, many currently available glass wall products utilize standard aluminum "storefront" posts grouted directly into open cavities of concrete blocks. In addition, many of these products also utilize wedge vinyl glazing commonly used in storefront applications to help secure the glass to the aluminum posts. The wedge vinyl is typically rolled into the slot located in the post in a space located between the glass and the post.

Although existing "storefront" technology can be used to construct glass wall structures, certain problems can result from using "storefront" technology in glass wall applications. For example, over time, lime in the concrete can react with the aluminum post material grouted directly into concrete, which can weaken the posts. Further, ultraviolet rays and various pollutants, such as salt, can cause the vinyl wedges used to secure the glass to the posts to become brittle and shrink. As a result, the glass can become loose within the slot on the posts. Accordingly, there is a need in the art for an improved glass wall system.

BRIEF SUMMARY OF THE INVENTION

The present invention provides for a glass barrier system for use in conjunction with base structures, such as concrete slabs or other masonry walls and structures. The glass barrier system can include one or more pieces of glass supported between posts. The posts are connected with support members extending from the base structure. The support members can be configured to support the posts above the base structure. In one embodiment, the glass barrier system is constructed from pieces of glass supported between aluminum posts supported on steel members extending from concrete. A glazing bead may also be used to help fix the glass in position with respect to the posts.

In one aspect of the present invention, a glass barrier system adapted to be supported on a structure includes at least one support member having a first portion and a second portion. The first portion is adapted to be received within the structure with the second portion extending therefrom. The glass barrier system also includes at least one post adapted to connect with the second portion of the support member adjacent to the structure, and at least one piece of glass connected with the at least one post.

In another form, a glass barrier system adapted to be supported on a structure includes at least one support member having a first portion and a second portion with the first portion adapted to connect with the structure. The glass barrier system also includes at least one piece of glass defining at least one edge, and at least one post connected with the second portion of the at least one support member. The at least one post includes a first slot adapted to receive the at least one edge of the at least one piece of glass. The at least one post is connected with the second portion of the support member such that the at least one post is supported above the structure.

In yet another form, a glass barrier system adapted to be supported by a structure includes a first support member having a first end portion and a second end portion. The first end portion is adapted to connect with the structure. The glass barrier system also includes a first piece of glass defining a first edge, and a first post connected with the second portion of the first support member. The first post includes a first slot adapted to receive the first edge of the first piece of glass.

The features, utilities, and advantages of various embodiments of the invention will be apparent from the following more particular description of embodiments of the invention as illustrated in the accompanying drawings and defined in the appended claims.

DETAILED DESCRIPTION OF THE INVENTION

The present invention provides a glass barrier system constructed from pieces of glass supported between posts extending upward from various types of base structures, such as concrete slabs, masonry walls, and other similar structures. The posts are supported by support members connected with or embedded into the base structure. For example, in one embodiment of the glass support system, aluminum posts are supported by steel members embedded into and extending from a concrete base structure. By supporting the aluminum posts above the concrete, the glass barrier system can eliminate problems associated with lime in the concrete reacting with the aluminum posts. The glass barrier system according to the present invention can provide other benefits when installed as part of a larger construction project, such as a new building construction. For example, because the posts are not connected with or embedded directly into the base structure, the present invention allows the posts to be installed later in the construction process. As such, the likelihood of damage caused to the posts while other construction activities take place is reduced. Some embodiments of the present invention also utilize a U-shaped glazing channel to securely and reliably hold the glass in place with respect to the posts. The glazing channel include soft rubber lips co-extruded with a rigid vinyl material. The rigid vinyl material frictionally engages the glass and the post to hold the glass in position, while the soft rubber lips help prevent outside contaminants, such as salt, from reaching the vinyl. While the present invention is described and depicted below with reference to installation on top of a concrete wall, it is to be appreciated that the present invention can also be utilized in conjunction with other structures, such as a deck or slab. It also to be appreciated that the posts and support members can be made from various types of materials and are not limited to being constructed from aluminum and steel.

Figure 1:
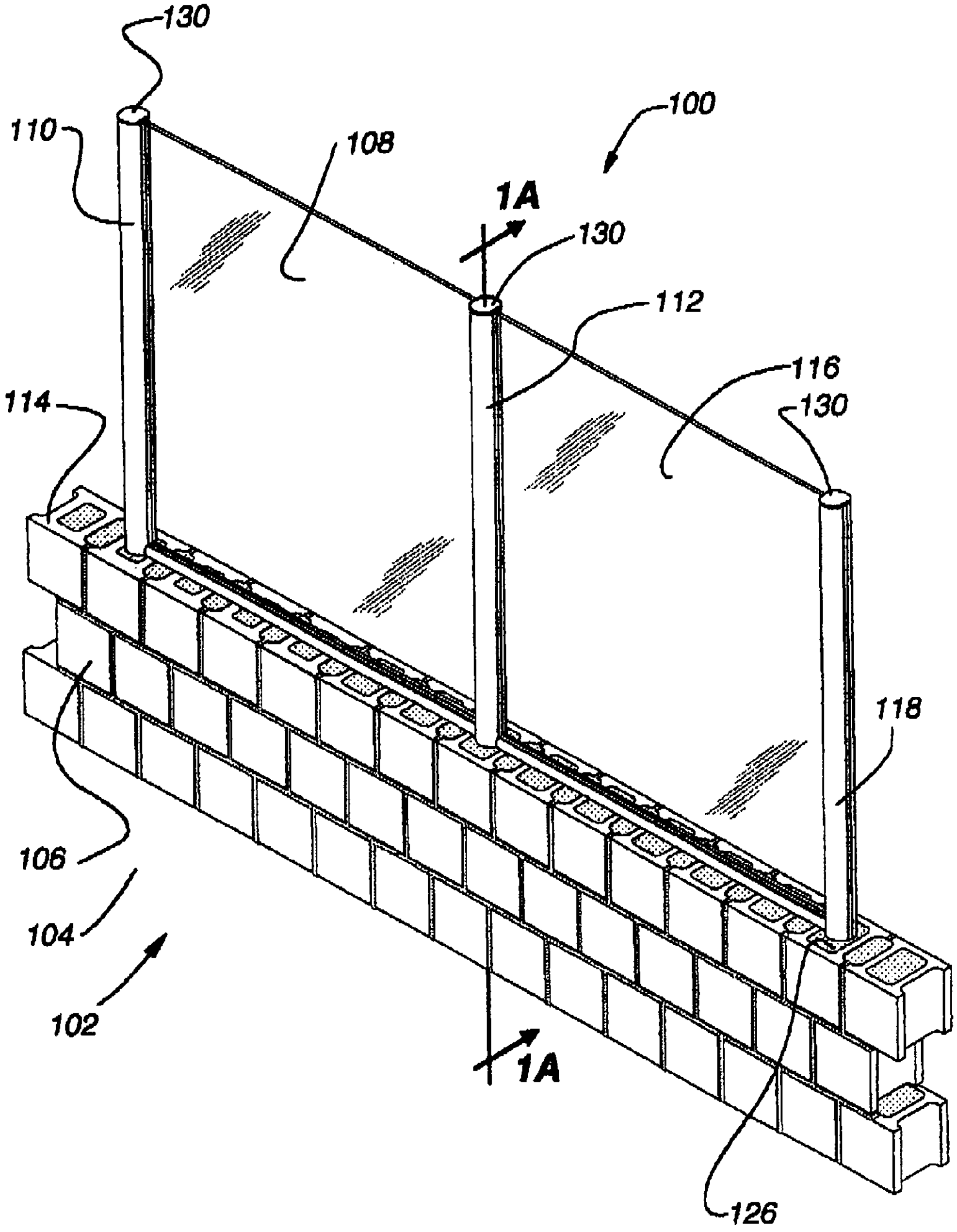
FIG. 1 is an isometric view of a glass barrier system according to one embodiment of the present invention installed on top of a wall.
Figure 1A:
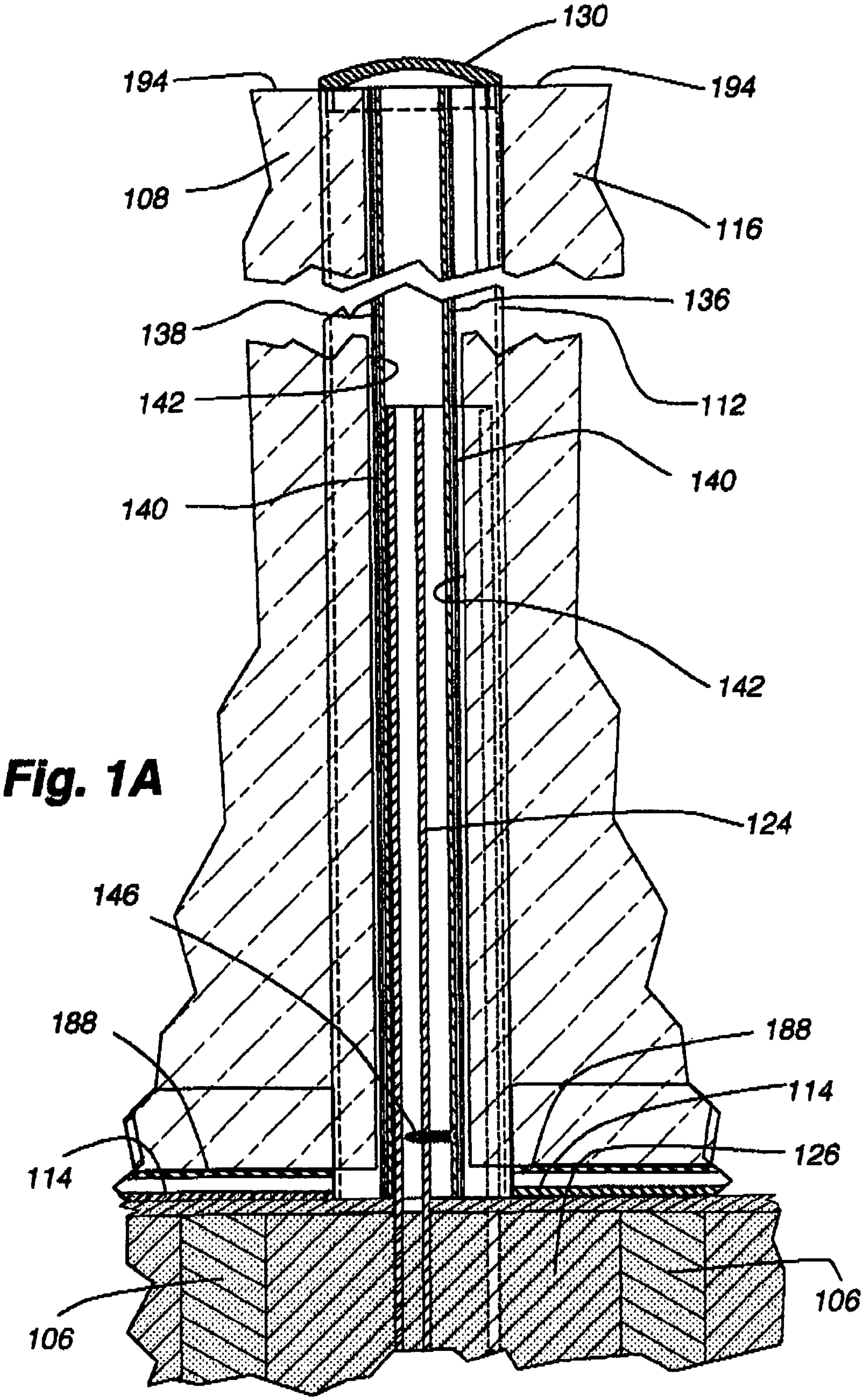
FIG. 1A is a cross sectional view of the glass barrier system shown in FIG. 1, taken along line 1A-1A.

FIGS. 1 and 1A show a glass barrier system 100 according to one embodiment of the present invention installed on top of a base structure 102. The base structure shown in FIGS. 1 and 1A is a wall 104 constructed from a plurality of concrete cinder blocks 106. As shown in FIG. 1, a first generally rectangular-shaped piece of glass 108 is supported between a first post 110 and a second post 112 extending from a top surface 114 of the wall 104. Further, a second generally rectangular-shaped piece of glass 116 is supported between the second post 112 and a third post 118 extending from the top surface of the wall 104. In some embodiments of the present invention, the first, second, and third posts are identically constructed, while other embodiments can utilize varying post configurations. For example, some posts may be configured to support pieces of glass from opposing sides, while other posts may be configured to support pieces of glass from only one side. The post heights and distances between the posts can also vary depending upon the particular application. For example, in one embodiment of the present invention, the posts are 48 inches tall and are spaced apart from each other by a distance of 72 inches. Although the glass barrier shown in FIGS. 1 and 1A is constructed with three posts and two pieces of glass, it is to be appreciated that more or fewer pieces of glass and associated posts can be used to increase or reduce the overall length of the glass barrier.

Figure 2:
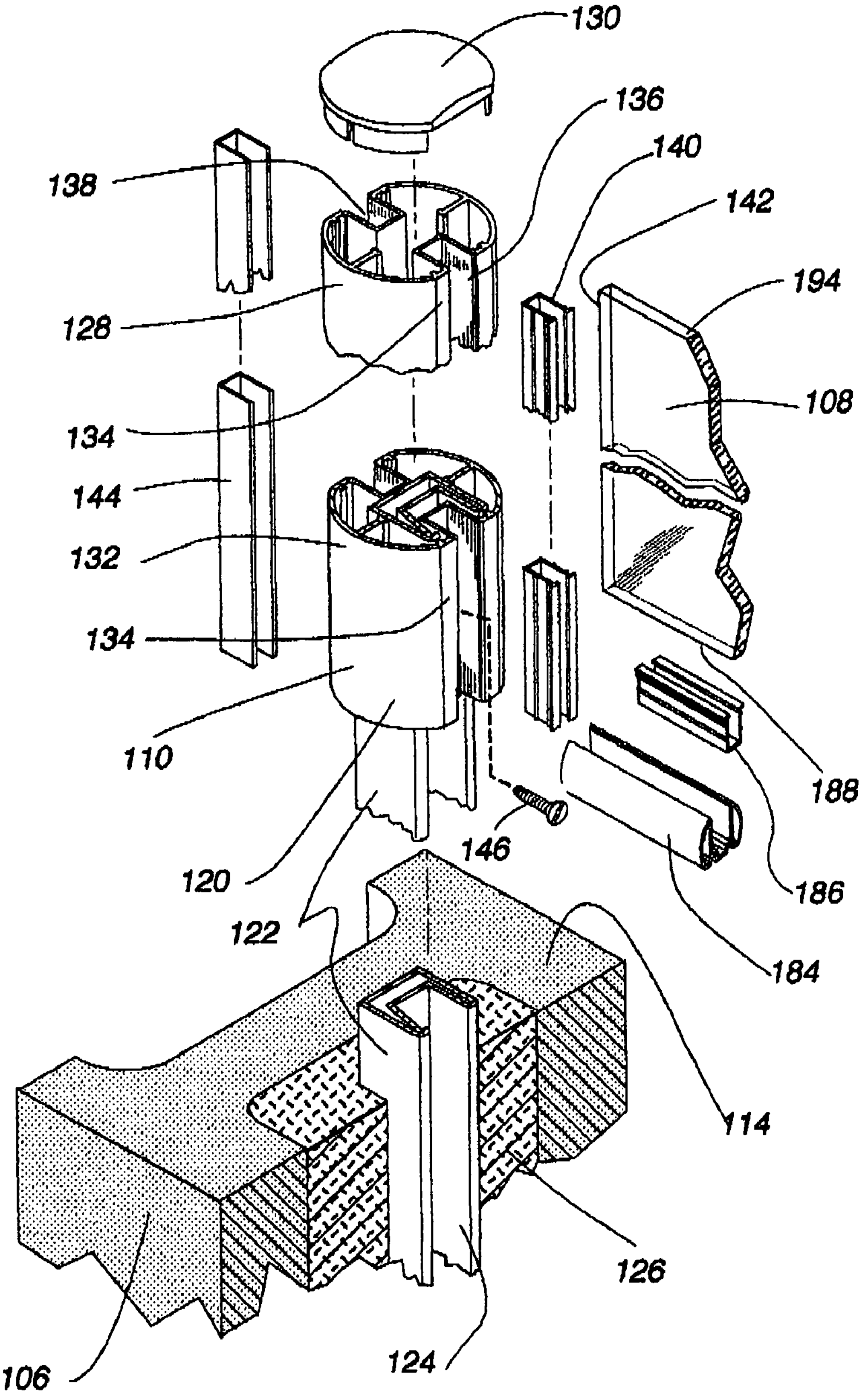
FIG. 2 is an exploded isometric view of a first post shown in FIG. 1.

FIG. 2 shows an exploded isometric view of the first post 110 shown in FIG. 1. As shown in FIG. 2, a lower portion 120 of the first post 110 is adapted to receive an upper portion 122 of a support member 124 extending from grout 126 in the wall 104, and an upper portion 128 of the first post 110 is adapted to connect with a post cap 130. The cross section of the first post 110 is generally elliptically-shaped and is defined by two opposing rounded sides 132 connected with two opposing generally flat sides 134. It is to be appreciated that post cross sections shaped differently from that which is depicted may also be used with the present invention. For example, one embodiment of the present invention utilizes posts having a square cross section.

The first post 110 shown in FIG. 2 includes a first slot 136 and a second slot 138 extending inwardly from the two opposing generally flat sides 134 and extending longitudinally along the length of the first post 110. The first slot 136 and the second slot 138 are adapted to receive a U-shaped glazing bead 140, which in turn, is adapted to receive a side edge portion 142 of the first piece of glass 108, as discussed in more detail below. Although the first and second slots shown in FIG. 2 extend longitudinally along the entire length of the first post, in other embodiments of the present invention, the slots extend longitudinally for a distance that is less than the entire length of the post. Because the first post depicted in FIG. 2 is utilized as an end post in the glass barrier system, a slot blank 144 can be placed inside the second slot 138 to provide an aesthetically pleasing look to the post. The second slot is also capable of receiving the glazing bead and glass piece in the same manner as illustrated in relation to the first slot, as illustrated with reference to the second post shown in FIG. 1. Although the second slot 138 shown in FIG. 2 is substantially a mirror image of the first slot 136, the first post can include differently configured slots. In addition, the post can include more than two slots or a single slot. For example, in some embodiments of the present invention, posts that are to be used as end posts in the glass barrier system are configured with a single slot. In these types of configurations, slot blanks are not needed. It is also to be appreciated that the slots need not be located on opposing sides of the post. For example, the slots can be located in various locations in the post with respect to each other to define various angles between the pieces of glass. In one scenario, the first and second slots are located in adjacent sides of the post to form a corner in the glass barrier system defining a 90 degree angle between the first and second pieces of glass supported by the slots.

As shown in FIG. 2, the lower portion 120 of the post 110 is configured to receive the upper portion 122 of the support member 124 such that the post is suspended above the top surface 114 of the base structure 102. Because the post is not in direct contact with the base structure, the base structure material cannot easily react with the post material. For example, a base structure constructed from concrete can include lime in the concrete that could otherwise react with the post material. This can be important when aluminum posts are utilized with the present invention, because lime can react with the aluminum to weaken the posts. It is to be appreciated that the post can be connected with and/or support by the support member in various ways. For example, as shown in FIG. 4, screws 146 are used to connect the post 112 with the support member 124. It is to be appreciated that bolts or other similar types of fasteners can also be used to connect the post with the support member. In other embodiments, a ledge on the inside of the post supports the post on top of the support member. In still other embodiments of the present invention, it may be advantageous to apply adhesive to bond the post to the support member. Although the post is depicted as receiving the support member, the post may be connected with the support member in various other ways. For example, in one embodiment of the present invention the post is received within the support member. The support member can also be constructed from various types of materials and can be configured to extend various distances into the grout and the post. For example, in some embodiments of the present invention, the support member is constructed from steel, and is configured to extend 12 to 16 inches into the grout and 12 inches into the post.

Figure 3:
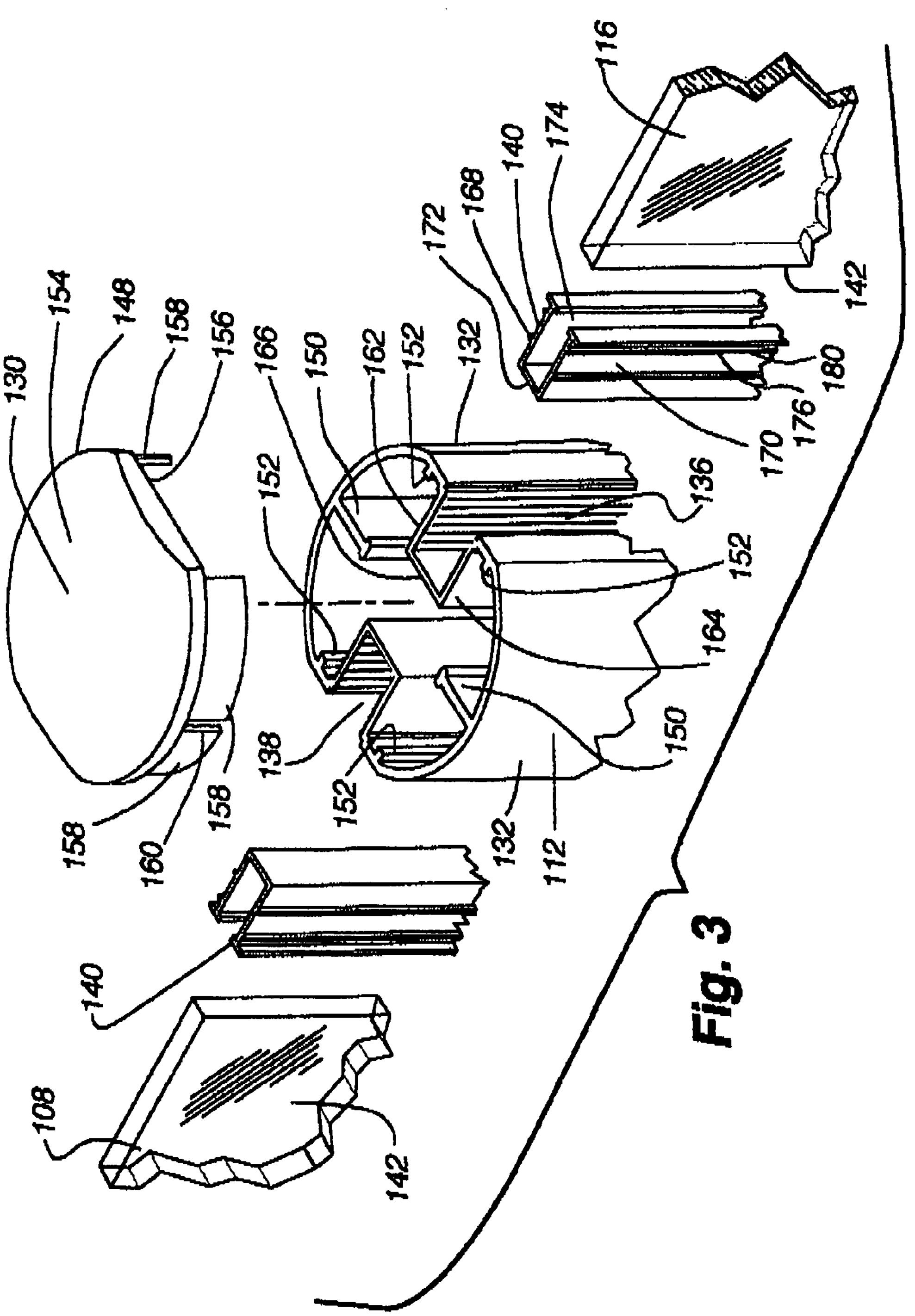
FIG. 3 is an exploded detailed isometric view of a second post shown in FIG. 1.

As shown in FIGS. 1-3, the glass barrier system can include the post cap connected with the upper portion of the post. Various post cap configurations may be utilized with the present invention. For example, as shown in FIG. 3, the post cap 130 can define an outer perimeter 148 that corresponds with the shape and size of the post cross section. The post cap and post define interconnecting structures to help ensure proper alignment between the post and post cap when connecting the post cap to the post. More particularly, the post includes a pair of opposing webs 150 extending inwardly from the rounded sides 132 and four inwardly extending ledges 152 adjacent the slots 136, 138 adapted to engage the post cap 130. The opposing webs 150 may extend from the rounded sides 132 towards the support member 124 in a direction of extension that is generally perpendicular to the direction of extension of the support member 124. In one embodiment, the distal edges of the opposing webs 150 may be configured so as to contact the support member 124, and may have a flattened edge portion that is thicker than the rest of the web 150. The post cap 130 also includes an upper surface 154 and a lower surface 156. Two pairs of cap extensions 158 extending downward from the lower surface 156 of the post cap 130 define a gap 160 between each pair of cap extensions. When the post cap 130 is connected with the post, the cap extensions are received within the post and abut the ledges to help align the post cap with the post. In addition, the caps 160 receive the opposing webs 150 on the inside of the post 112. The cap extensions can also be configured to frictionally engage the inside of the post to help secure the post cap to the post.

As described in more detail below, the pieces of glass are connected with the posts by installing the glazing bead on the side edge portions of the pieces of glass and then inserting the glazing beads and side edge portions of the pieces of glass into the slots on the post. The slots are configured such when the glazing beads and glass are received within the slots, the glazing beads are compressed against the sides of the slot and the glass. This compression fit creates friction forces between the slot, the glazing bead, and the glass that act to hold the glass in position relative to the slot. One-way barbs, when used on the glazing bead, also act to prevent the glass from separating from the post.

As shown in FIGS. 1-3 and as previously mentioned, the pieces of glass 108, 116 are supported by the posts 110, 112, 118 by inserting the side edge portions 142 of the pieces of glass into the glazing beads 140. The glazing beads and side edge portions of the glass, in turn, are inserted into the slots 136, 138 in the post 112. As shown in FIG. 3, the first and second slots 136, 138 are U-shaped and are each defined by a first side 162 and a second side 164 connected with a base side 166. The glazing beads are also U-shaped and are each defined by a first glaze side 168 and a second glaze side 170 connected with a base glaze side 172. The glazing bead can be made from various materials, such a plastic, rubber, and vinyl. In some embodiments, the glazing beads include one-way barbs extending along inner and outer surfaces of the glazing bead to engage the slots in the post as well as the pieces of glass.

As shown in FIG. 3, when connecting the second piece of glass 116 with the second post 112, the glazing bead 140 is placed on the side edge portion 142 of the second piece of glass such that the glass is in contact with inner surfaces 174 of the first glaze side 168, the second glaze side 170, and the third glaze side 172. The side edge portion 142 of the second piece of glass 116 and the glazing bead 140 are then inserted into the first slot 136 on the second post 112 such that outer surfaces 176 of the first glaze side 168, the second glaze side 170, and the base glaze side 172 contact the first side 162, second side 164, and third side 166 of the first slot 136, respectively. As previously mentioned, the insertion of the second piece of glass and the glazing bead into the first slot causes the glazing bead to become compressed between the glass and the slot. This compression fit helps to hold the glass in a fixed position relative to the post. As previously mentioned, the glazing bead can also include one-way barbs to help hold the glass in position. As shown in FIG. 4, the first side 162 and the second side 164 of the first slot 136 and the second slot 138 are configured with barbs 178 that interact with barbs 180 on the glazing bead 140. The first piece of glass can be connected with the second post in the same manner as described above with reference to the second piece of glass.

Figure 4A:
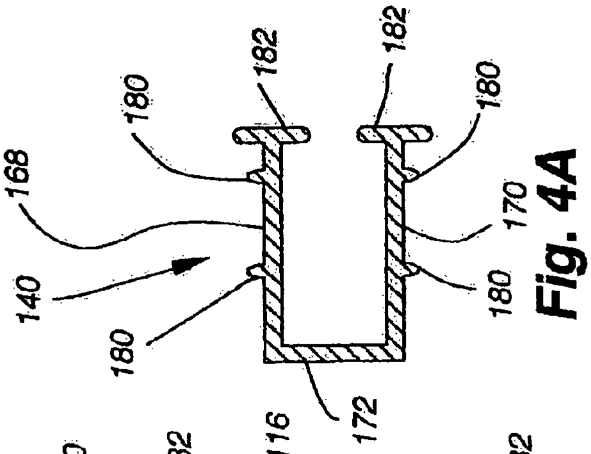
FIG. 4A is a cross-sectional view of a glazing bead shown in FIG. 4 before being installed.
Figure 4:
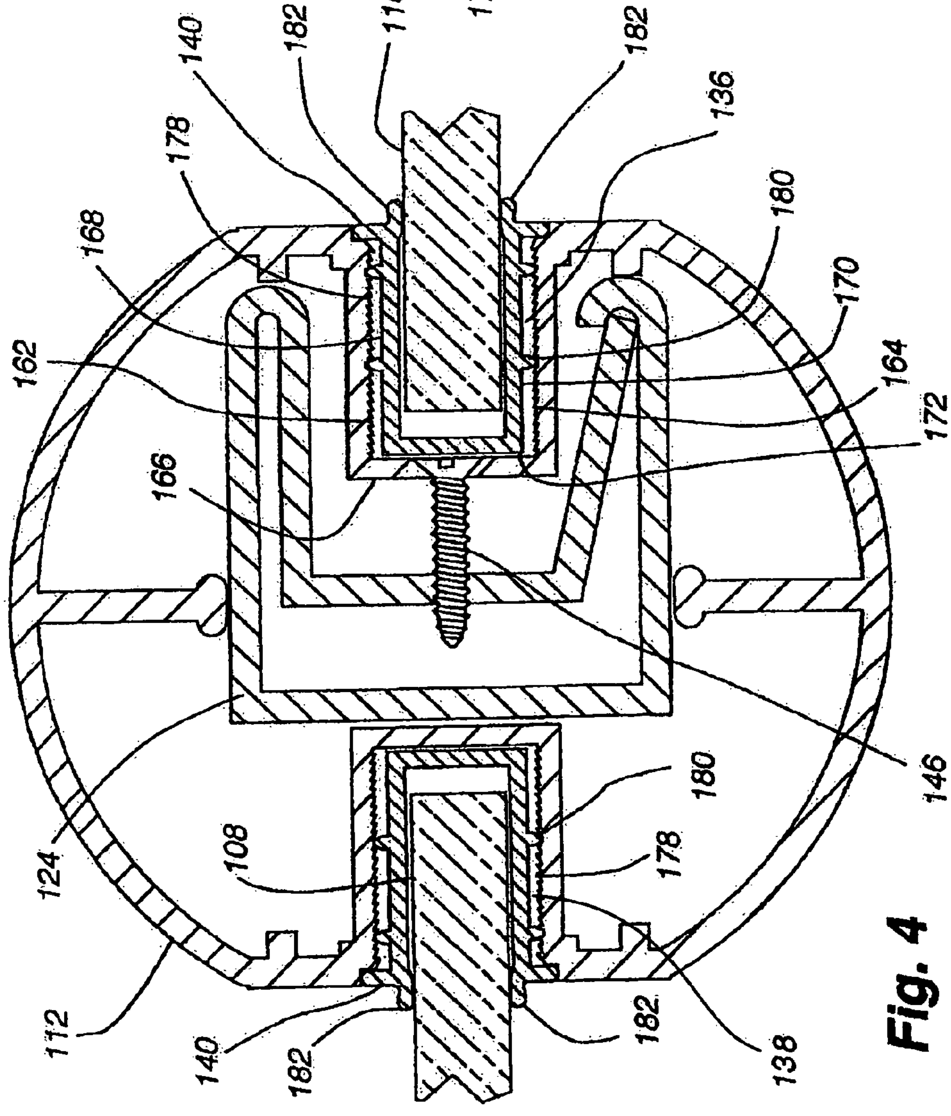
FIG. 4 is a top view of the second post shown in FIG. 1.

As previously mentioned and as shown in FIGS. 4 and 4A, the glazing beads 140 can include lips 182 connected with the first glaze side and the second glaze side. As shown in FIG. 4, the lips 182 bend and engage opposing sides of the piece of glass when installed. As such, the lips create a barrier between the outside environment and the frictional engagement between the glazing bead, the glass, and the slot. This barrier helps to prevent various contaminants, such as salt, from entering the slot and reacting the glazing bead material. As previously mentioned, the glazing bead can be made from various types of materials. In one embodiment, the lips are made from soft rubber and the glaze sides are constructed from rigid vinyl. Although the lips shown in FIG. 4 are bent outward away from the slot, the lips can also be configured to bend inward toward the slot. In addition, the glass may also be configured with trenches on each side thereof adapted to accept the lips extending inward from the glazing bead.

Figure 5:
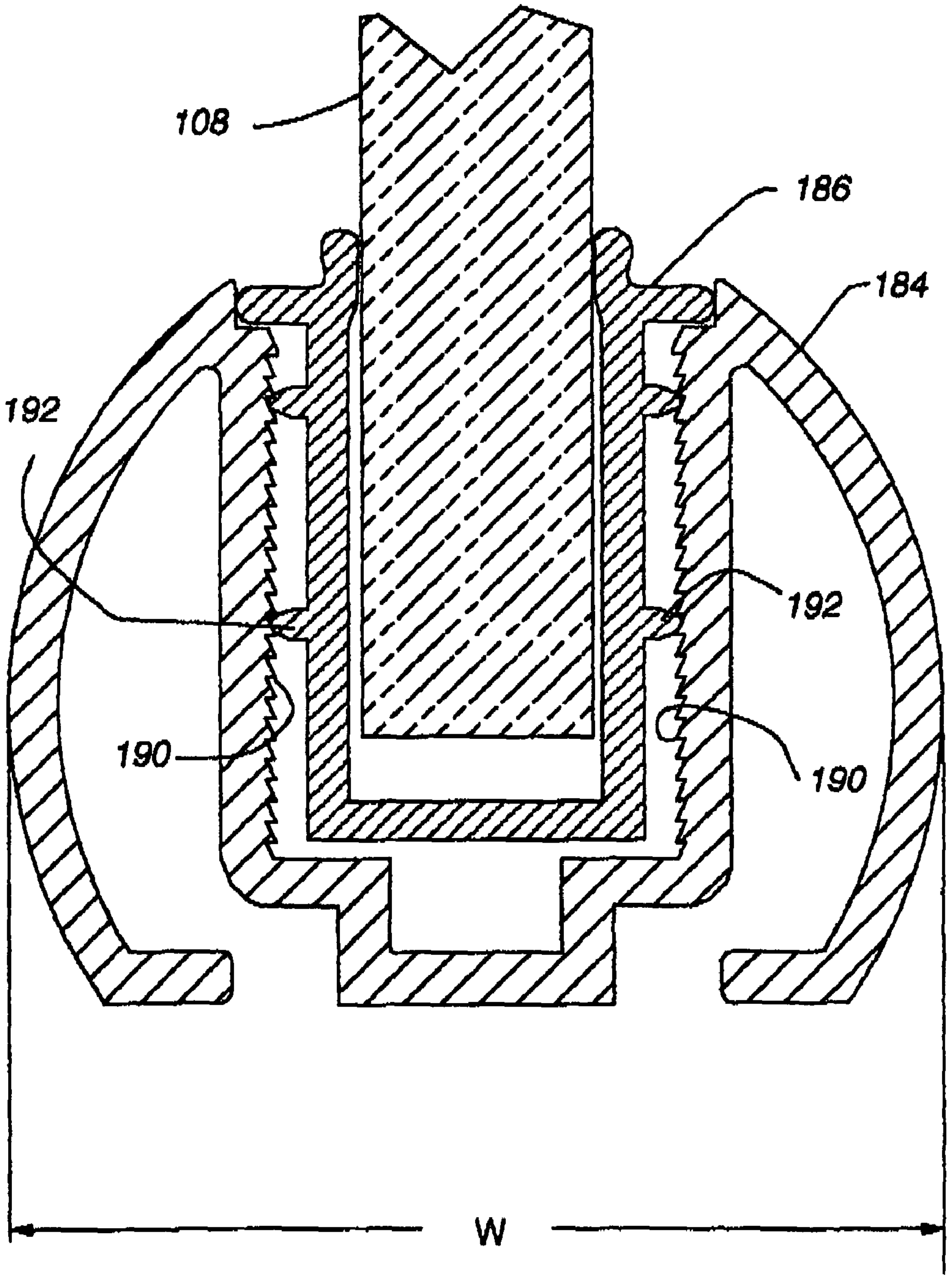
FIG. 5 is a side view of a bottom rail installed on a piece of glass.

As shown in FIG. 2, the glass barrier system can also include a lower railing 184 secured to the glass with a bottom rail glazing bead 186 connected with a bottom edge 188 of the glass 108 in a similar manner as described above with reference to the glass and the post. As shown in FIG. 5, the bottom rail 184 can also be configured with barbs 190 that interact with barbs 192 extending from the bottom rail glazing bead 186 to help hold the bottom rail 184 securely to the glass. It is to be appreciated that bottom rails of sizes and shapes may be utilized. For example, one embodiment of the present invention utilizes a bottom rail width, W, of 1.3 inches. In addition, the glass barrier system can also include an upper railing (not shown) along a top edge 194 of the piece of glass.

It will be appreciated from the above noted description of various arrangements and embodiments of the present invention that a glass barrier system has been described which may include: a support member adapted to be connected with a base structure, a post connected with the support member so as to support the post in a position away from the base structure, and at least one piece of glass connected with the post. The glass barrier can be formed and configured in various ways depending upon the particular application. It will be appreciated that the features described in connection with each arrangement and embodiment of the invention are interchangeable to some degree so that many variations beyond those specifically described are possible. For example, the glass barrier system can be assembled so as to include only one support member, one post, and one piece of glass in situations where an opposing end of the glass can be supported by some other structure, such as a wall. In another scenario, the posts of the glass barrier system are configured to support two or more vertically arranged pieces of glass within a single slot. In such a configuration, the bottom edge of an upper piece of glass can be adjacent to the top edge of a lower piece of glass. In addition, the bottom and top edges may or may not be in contact with each other. The glass barrier system can also be configured to accommodate glass pieces of various thickness. For example, some embodiments of the glass barrier system are configured to accommodate glass having a thickness of ¼, ⅜, and ½ inch. In one embodiment that accommodates ½ inch thick glass, the glazing bead is removed and the glass is wet-glazed into the slot.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A barrier system adapted to be supported on a structure, the barrier system comprising: at least one support member having a first portion and a second portion, said first portion being adapted to be received within the structure with said second portion extending therefrom and including a channel extending along at least a portion of the length of said first portion, said second portion including a channel extending along at least a portion of the length of said second portion;

at least one post adapted to connect with said second portion of said support member adjacent to the structure, said post including a perimeter and at least one slot formed along at least a portion of a length of said at least one post and extending inwardly from said perimeter, said slot extending inwardly into said channel in said second portion;

at least one planar member defining an end edge;

and wherein at least a portion of said end edge of said at least one planar member is received into said at least one slot in said at least one post, wherein said at least a portion of said end edge is positioned inwardly of said perimeter of said at least one post;

and wherein said at least one post fits over and receives said second portion of said support member.

2. The barrier system of claim 1, further comprising a glazing bead adapted to fit between said edge of said at least one planar member and said slot.

3. The barrier system of claim 2, said glazing bead including at least one barb adapted to frictionally engage said slot.

4. The barrier system of claim 1, wherein said at least one support member is bolted to said at least one post.

5. The barrier system of claim 1, further comprising a rail adapted to connect with said at least one planar member.

6. A barrier system adapted to be supported on a structure, the barrier system comprising: at least one support member having a first portion and a second portion, said first portion adapted to connect with the structure and including a channel extending along at least a portion of the length of said first portion, said second portion including a channel extending along at least a portion of the length of said second portion;

at least one planar member defining at least one edge;

at least one post connected with said second portion of said at least one support member, said at least one post including a perimeter and at least one slot formed along at least a portion of a length of said at least one post and extending inwardly from said perimeter, said slot extending inwardly into said channel in said second portion;

wherein at least a portion of said at least one edge of said at least one planar member is received into said at least one slot in said at least one post, wherein said at least a portion of said end edge is positioned inwardly of said perimeter of said at least one post;

and wherein said at least one post is connected with said second portion of said at least one support member such that said at least one post is supported above the structure;

and wherein said at least one post fits over and receives said second portion of said at least one support member.

7. The barrier system of claim 6, wherein said at least one support member is bolted to said at least one post.

8. The barrier system of claim 6, further comprising a rail connected with said at least one planar member.

9. A barrier system adapted to be supported by a structure, the barrier system comprising: a first support member having a first end portion and a second end portion, said first end portion adapted to connect with the structure and including a channel extending along at least a portion of the length of said first end portion, said second end portion including a channel extending along at least a portion of the length of said second end portion;

a first planar member defining a first edge;

a first post connected with said second end portion of said first support member, said first post including a first slot adapted to receive said first edge of said first planar member, wherein said first slot extends inwardly of a perimeter of said first post, said slot extending inwardly into said channel in said second portion;

and wherein at least a portion of said first edge of said first planar member is received into said first slot in said first post, wherein said at least a portion of said end edge is positioned inwardly of said perimeter of said first post;

and wherein said first post fits over and receives said second end portion of said first support member.

10. The barrier system of claim 9, wherein said first support member is bolted to said first post.

11. The barrier system of claim 9, further comprising a rail adapted to connect with said first planar member.

12. The barrier system of claim 9, wherein said first planar member defines a second edge and wherein the barrier system further comprises:

a second support member having a first end portion and a second end portion, said first end portion adapted to connect with the structure; and a second post connected with said second end portion of said second support member, said second post including a second slot adapted to receive said second edge of said first planar member, wherein said second slot extends inwardly of the perimeter of said second post; and wherein at least a portion of said second edge of said first planar member is received into said second slot, wherein said at least a portion of said end edge is positioned inwardly of said perimeter of said second post.

13. The barrier system of claim 9, wherein said first post includes a second slot.

14. The barrier system of claim 13, further comprising:

a second planar member defining a second edge; said second edge received within said second slot.

15. The barrier system of claim 14, wherein said first planar member and said second planar member are aligned within the same plane.

16. The barrier system of claim 13, further comprising a slot blank adapted to be received within said second slot.

17. The barrier system of claim 1, wherein said at least one slot has at least one sidewall formed of rigid material.

18. The barrier system of claim 12 wherein the said first planar member is supported entirely by said first and said second posts.

19. The barrier system of claim 1 wherein said at least one post is upright.

20. The glass barrier system of claim 18 wherein the barrier system is absent handrails.

21. A barrier system as defined in claim 1, wherein:

said post defines a second slot opposite said at least one slot, and for receiving an edge of an at least second planar member.

22. A barrier system as defined in claim 1, wherein:

said post includes at least one web extending from said perimeter inwardly to said second portion of said at least one support member.

23. A barrier system as defined in claim 6, wherein:

said post defines a second slot opposite said at least one slot, and for receiving an edge of an at least second planar member.

24. A barrier system as defined in claim 6, wherein:

said post includes at least one web extending from said perimeter inwardly to said second portion of said at least one support member.

25. A barrier system as defined in any of claim 1, 6 or 9 wherein said planar member is a piece of glass.

26. The barrier system as defined in claim 22, wherein:

said at least one web extends from said perimeter towards said second portion in a direction that is substantially perpendicular to a direction of extension of said at least one support member.

27. The barrier system as defined in claim 22, wherein:

the at least one web includes a distal edge portion that is configured to engage the second portion of the at least one support member.

28. The barrier system as defined in claim 27, wherein:

the distal edge portion of the at least one web has a greater thickness than any other portion of the web.

* * * * *